United States Patent [19]
Hollander et al.

[11] 3,916,691
[45] Nov. 4, 1975

[54] ELECTRICALLY ACTUATED COLD JUNCTION COMPENSATING DEVICE

[75] Inventors: Betty Ruth Hollander; William Earl McKinley; George Davis Paight, all of Stamford, Conn.

[73] Assignee: Omega Engineering, Inc., Stamford, Conn.

[22] Filed: Mar. 19, 1974

[21] Appl. No.: 452,498

[30] Foreign Application Priority Data
Mar. 26, 1973 United Kingdom............... 14323/73

[52] U.S. Cl. .................. 73/361; 136/182; 320/48; 324/29.5; 340/249
[51] Int. Cl.² .................. G01K 7/12; G08B 21/00
[58] Field of Search ......... 73/361; 136/182; 320/48; 324/29.5; 340/249

[56] References Cited
UNITED STATES PATENTS

| | | | |
|---|---|---|---|
| 3,280,630 | 10/1966 | Latham | 73/361 |
| 3,534,354 | 10/1970 | Galginaitis | 320/38 X |
| 3,739,264 | 6/1973 | Resh | 340/249 UX |
| 3,823,367 | 7/1974 | Kaye et al. | 324/29.5 |
| 3,832,629 | 8/1974 | Cernek | 324/29.5 |

*Primary Examiner*—Richard C. Queisser
*Assistant Examiner*—Frederick Shoon
*Attorney, Agent, or Firm*—William Anthony Drucker

[57] ABSTRACT

A thermocouple cold junction compensating device intended for use in extreme environmental conditions of external pressure, shock, vibration etc. may be provided with a small battery which is encapsulated with the remainder of the components. The invention provides an improvement whereby the condition of the battery may be checked immediately and accurately from the exterior, without recourse to destruction of the sealing or encapsulation, by completion externally of the device of a current-feed circuit of a light source included within a light-transmitting housing of the device.

3 Claims, 2 Drawing Figures

ELECTRICALLY ACTUATED COLD JUNCTION COMPENSATING DEVICE

This invention relates to sealed electronic devices of the kind which include a battery as a power source.

Sealed electronic devices are commonly required for use in extreme environmental conditions of external pressure, shock, vibration and so on, and for this purpose they may contain a small battery which is encapsulated with the remainder of the components.

There are many devices of this nature in which the state of life of the battery is critical for the proper operation of the circuits or circuit involved, and it accordingly becomes vital to be able to check the condition of the battery, and in particular to ascertain whether it has run down to an extent that the supply available from it will no longer suffice for proper operation. It is not practical to use miniature meters or moving coil indicators because of the extreme environmental conditions to which the device may be subjected, particularly violent mechanical shocks.

It is accordingly the object of the present invention to provide an improvement, to such sealed devices, whereby there may always be obtained, without recourse to destruction of the sealing or encapsulation, an immediate and accurate indication of the state of criticality, or otherwise, of a battery included in the device.

According to the present invention a sealed electronic device comprises an at least partially light-transmitting sealed housing, an electrically-operable light source disposed in said housing such that its illumination is visible from the exterior of the housing, a battery in said housing, and a pair of conductors emerging from said housing to the exterior of the device, said light source and said battery and said conductors being arranged in a current-feed circuit for the light source which can be completed by conductively bridging said pair of conductors externally of the housing. In order to provide a visible assessment of the criticality, or otherwise, of the state of the battery, the light source may be such that it will become illuminated, upon completion of its current-feed circuit, only so long as the battery power available is not less than a critical level. Alternatively, the current-feed circuit of the light source may be such that, upon completion thereof, the light source will become illuminated only so long as the battery power available is not less than a critical level.

The light source is preferably such as to impose a minimum of drain on the battery, when used for testing. Advantageously it is also very small in bulk and weight, for use in miniature and sub-miniature applications. By way of example, the light source may for these purposes consist of a light-emitting diode. In a practical embodiment of self-powered thermo-couple reference junction the light source is a small pea-sized device which is triggered by a voltage source of 1.35 to 3.0 volts depending upon the nature of the application and the internal bridge design of the reference junction.

In a convenient arrangement, the conductors are a pair of wires which emerge through the sealing or encapsulation of the device and which, when connected, complete a simple circuit containing the battery and the light source. One of the wires may be one that is normally included in leads available on the device, so that only one additional lead is necessary.

The device may comprise an electrical bridge circuit in which the battery is included, and in a preferred embodiment the device comprises a cold junction in said housing, an electrical bridge circuit in said housing connected to said cold junction and including said battery and a temperature-sensitive resistance element electrically connected in series with and thermally integrated with the cold junction, a second pair of conductors connected to said cold junction and emerging from said housing for connection to a thermocouple, and a third pair of conductors connected one to said bridge and one to said cold junction and emerging from said housing for connecting to measuring instrumentation.

In order that the nature of the invention may be readily ascertained, an embodiment of ice-point compensator incorporating a light source in the manner of the invention is hereinafter particularly described with reference to the figures of the accompanying drawing, wherein.

Figure 1:
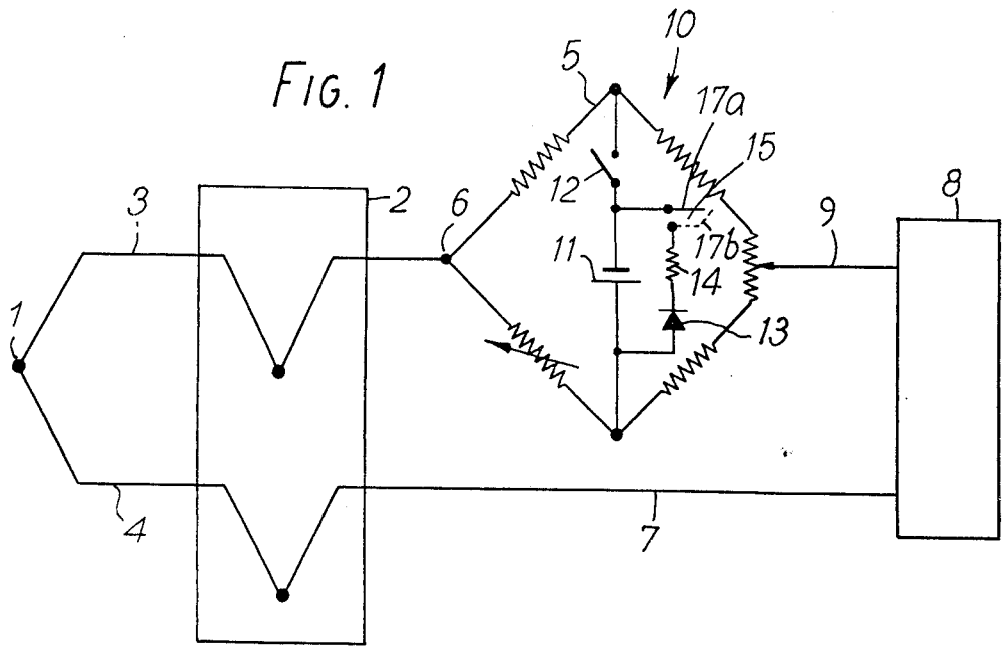
FIG. 1 shows the electrical circuit of the device.

Referring to FIG. 1, the circuit contains a self-compensating bridge network. A thermocouple element 1 is connected electrically in series with, and is also thermally integrated with, a cold junction 2. Conductor 3 is made of a material A, and conductor 4 is made of a material B.

Conductor 5, of copper, leads to point 6 of a bridge, and conductor 7 of copper leads to one terminal of a measurement device 8. The other terminal of the measurement device is connected by copper conductor 9 to the bridge, through a potentiometer 10. The bridge is energised by a mercury battery 11 which can be placed in circuit by a switch 12.

The output voltage of the device is proportional to the unbalance created between the pre-set equivalent reference temperature of the jucntion 2, and the temperature of the "hot" junction 1. In this system, the reference temperature may be chosen as 0°C or 32°F.

As the ambient temperature surrounding the cold junction 2 varies, a thermally generated voltage appears and produces an error in the output. However, an automatic equal and opposite voltage is introduced in series with the thermal error. This cancels the error and maintains the equivalent reference junction temperature over a wide range of ambient temperature with a high degree of accuracy. By integrating copper leads with the cold junction 2, the thermocouple material at 1 is not itself connected to the input terminal of the measurement device 8, thereby eliminating secondary errors.

In series circuit, across the battery 11, there are provided a light-emitting diode 13, a limiting resistor 14, and a switch 15. Items 11, 13, 14 and 15 constitute a test circuit which, when completed, will allow the diode to light if the battery voltage is still sufficient.

Figure 2:
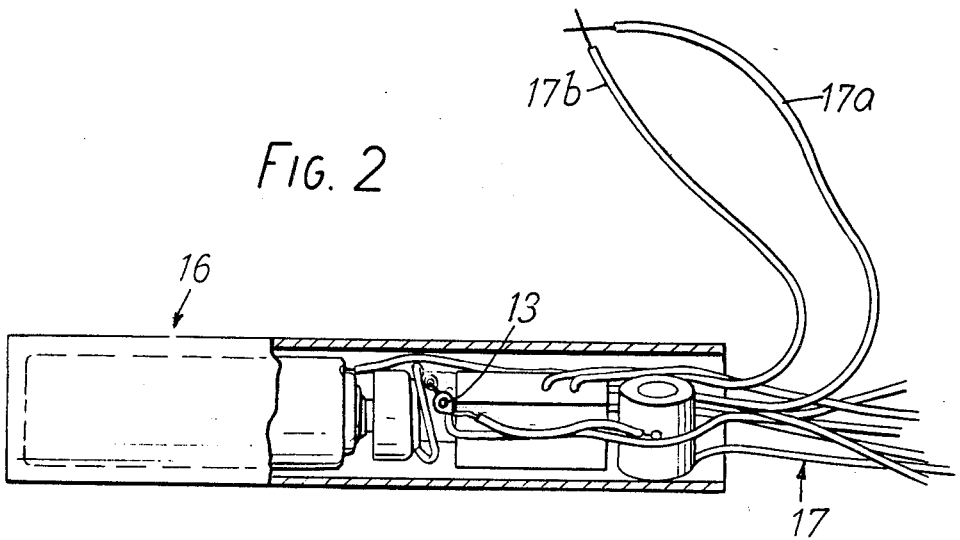
FIG. 2 is an elevation, with parts shown cut away, of the encapsulated device.

Referring now to FIG. 2, there is shown the practical embodiment of the circuit of FIG. 1. All of the various components of the circuit, including the battery, are enclosed or "potted" within an encapsulation 16 of transparent plastics material. The sealing of the components by the encapsulation is total, although not shown in detail as such in the drawing, and only the wires 17 emerge, through the sealing medium, to the exterior. Two of the wires 17a, 17b together constitute and switch 15 seen in FIG. 1. When these wires are caused to contact, the battery test circuit is completed, and the light-emitting diode 13 is caused to glow, provided that the voltage of the battery 11 is not less than a predetermined critical voltage necessary for the proper calibrated operation of the device.

It is accordingly possible to check the battery, to see if it is good or bad, without compromising the extreme ruggedness of the encapsulated unit. Only one extra external wire, say the wire 17a needs to be added to the six external wires 17 normally provided on such a unit. Alternatively, if it is desired to isolate the battery checking system from the remainder of the circuit, two extra wires may be added.

We claim:

1. A sealed totally encapsulated, potted electronic device comprising an at least partially light-transmitting sealed housing, an electrically-operable light source disposed in said housing and positioned therein such that its illumination may be viewed from the exterior of the housing, a battery in said housing, and a pair of conductors emerging from said housing to the exterior of the device, said light source and said battery and said conductors being disposed in a current-feed circuit for said light source which can be completed by conductively bridging said pair of conductors externally of the housing, said light source being selected such that it may be illuminated, upon completion of its current-feed circuit, only so long as the battery power available is not less than a critical level.

2. A sealed electronic device, as claimed in claim 1, wherein said light source is a light-emitting diode.

3. A sealed electronic device, as claimed in claim 1, further comprising a cold junction, an electrical bridge circuit in said housing connected to said cold junction and including said battery and a temperature-sensitive resistance element electrically in series with and thermally-integrated with the cold junction, a second pair of conductors connected to said cold junction and emerging from said housing for connection to a thermocouple, and a third pair of conductors connected one to said bridge and one to said cold junction and emerging from said housing for connection to measuring instrumentation.

* * * * *